United States Patent [19]

Conley

[11] Patent Number: 5,169,151
[45] Date of Patent: Dec. 8, 1992

[54] ELECTROMECHANICAL PUTTING TRAINER

[76] Inventor: William P. Conley, 2780 Packard, Ypsilanti, Mich. 48197

[21] Appl. No.: 829,425

[22] Filed: Feb. 3, 1992

[51] Int. Cl.[5] ............................................. A63B 69/36
[52] U.S. Cl. ................................ 273/186.2; 273/35 A
[58] Field of Search .......... 273/186 A, 186 R, 183 D, 273/194 R, 194 A, 194 B, 35 A

[56] References Cited

U.S. PATENT DOCUMENTS

| | | | |
|---|---|---|---|
| 1,712,609 | 5/1929 | Gibson | 273/186 A |
| 2,823,037 | 2/1958 | La Ferte | 273/186 A |
| 3,318,602 | 5/1967 | Kunihisa | 273/186 A X |
| 3,380,305 | 4/1968 | Charell | 273/186 A X |
| 4,082,286 | 4/1978 | LaBreche | 273/162 B |
| 4,330,123 | 5/1982 | Kleinerman | 273/54 B |
| 4,535,986 | 8/1985 | Richards | 273/29 A |
| 4,580,785 | 4/1986 | Toku | 273/186 A |
| 4,898,389 | 2/1990 | Plutt | 273/186 A |
| 4,930,787 | 6/1990 | Nobles | 273/186 A |
| 4,967,596 | 11/1990 | Rilling et al. | 273/186 A X |
| 5,082,283 | 1/1992 | Conley et al. | 273/186 A |

Primary Examiner—George J. Marlo
Attorney, Agent, or Firm—Krass & Young

[57] ABSTRACT

A golf putting stroke trainer includes an inertial sensor responsive to axial rotation disposed in electrical communication with an alarm circuit. The trainer is positioned within a standard putting club and provides a user-detectable signal if, during a putting stroke, the putter is rotated around the longitudinal axis of the shaft of the putter.

14 Claims, 2 Drawing Sheets

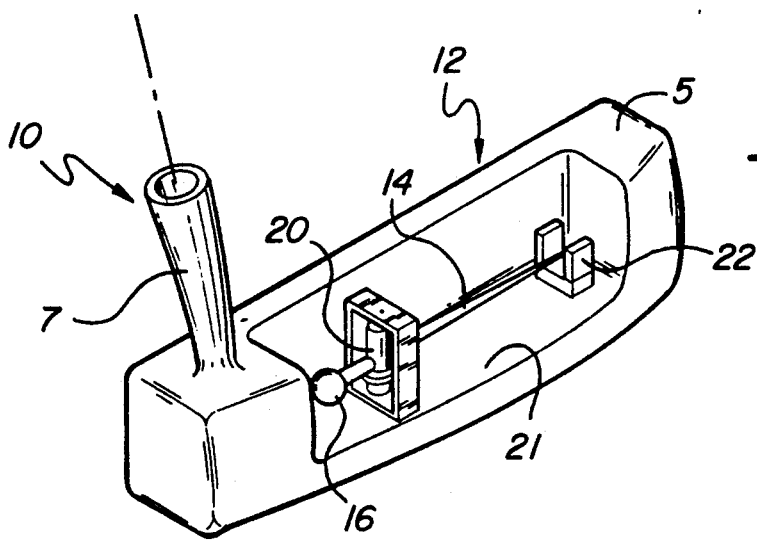
FIG-1
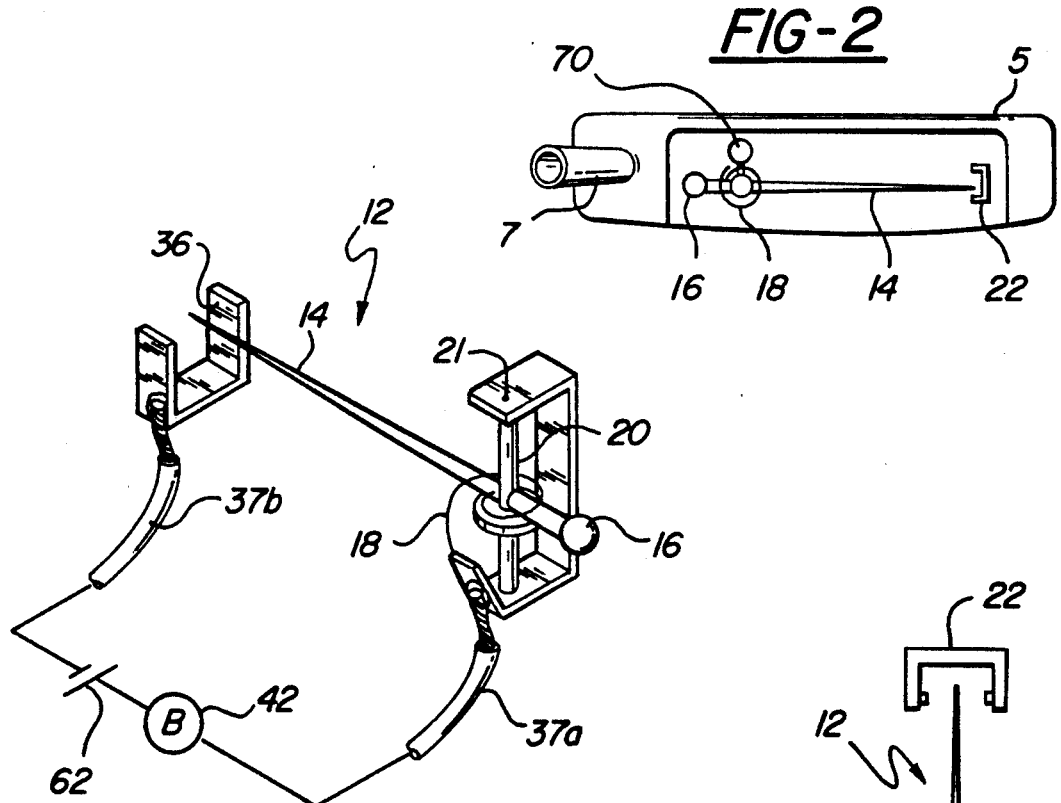
FIG-2
FIG-3
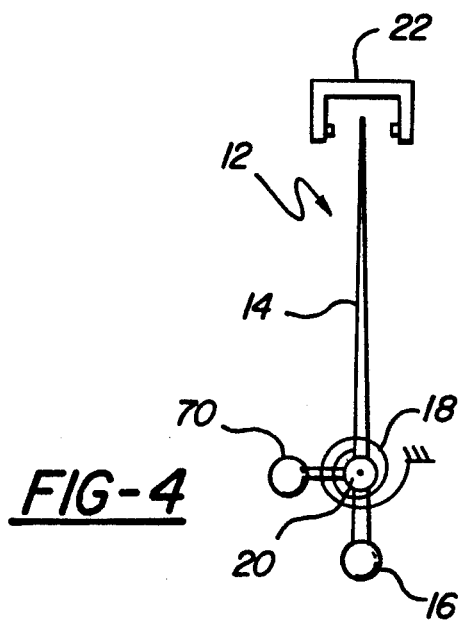
FIG-4

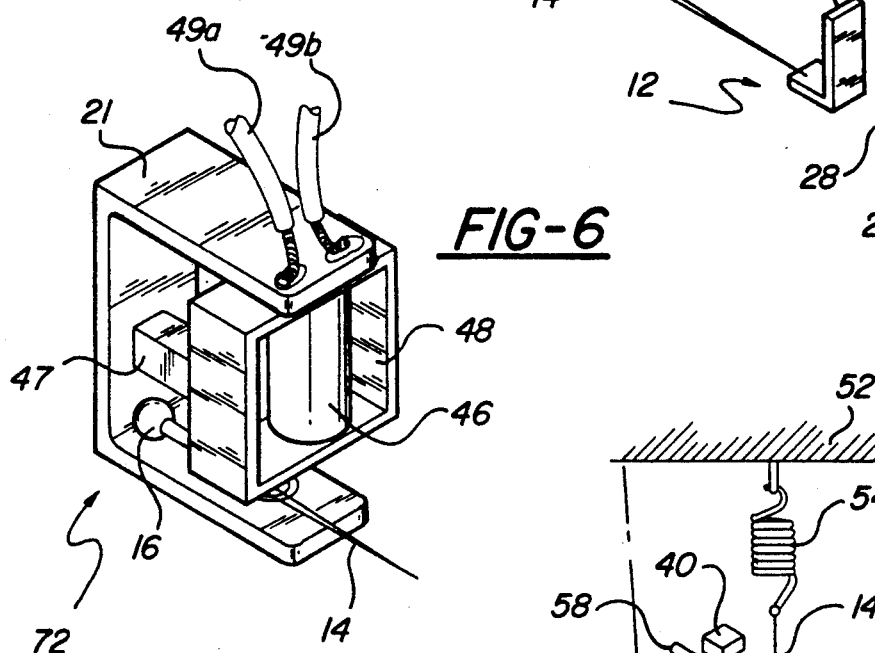
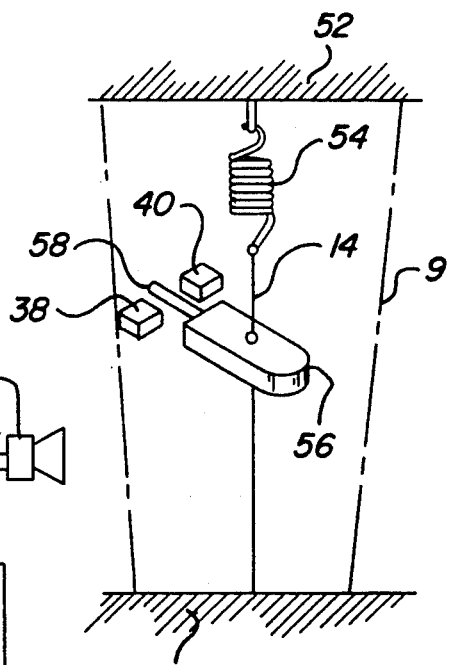
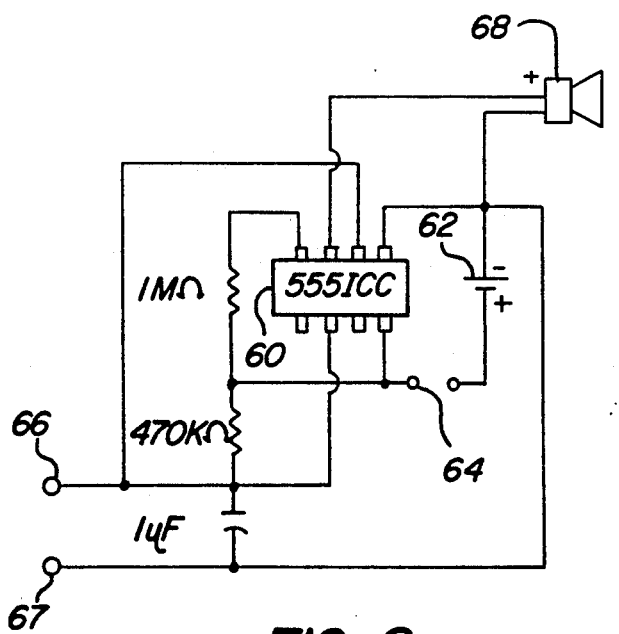

ELECTROMECHANICAL PUTTING TRAINER

FIELD OF THE INVENTION

This invention relates generally to training devices and more specifically to swing training devices. Most specifically, the present invention relates to an electromechanical device for instructing a golfer in a putting stroke.

BACKGROUND OF THE INVENTION

The game of golf, as well as various other physical activities, requires that a participant execute a precise set of physical maneuvers. Specifically, the game of golf requires that a player be capable of accurately swinging a club along a preferred path of travel within a proper range of velocity while simultaneously maintaining an appropriate orientation of the club. The putting stroke in particular is a very precise motion, demanding accurate neuromuscular programming. Acquisition of an effective putting stroke is typically achieved by long term repetition.

Many golfers employ the services of a professional trainer who observes and critiques their putting. Such services are expensive and are difficult to arrange at convenient times. Additionally, such critique generally provides a somewhat delayed feedback to the student. As a result of the foregoing, there has been a significant interest among golfers in the use of training devices for putting. It is highly desirable that a training device provide an accurate and substantially instantaneous feedback to the user as to the qualities of his or her putting stroke. It is further desirable that any such training device be usable in connection with fairly standard golfing equipment and that it be rugged, reliable and simple to use. Clearly, it is desirable that any training device for putting accurately evaluate all parameters of a proper stroke.

Heretofore, numerous devices have been developed to teach a proper putting stroke. Most of these devices element means to prevent the golfer's body from diverging from a proper swing plane. For example, it is known in the prior art to mount guide-like rails, or straps to the putter to constrain the motion of a golfer's body. Likewise, it is known to use electronic monitoring devices to determine whether or not a proper putting stroke has been achieved. However, these devices are awkward in appearance and, in the case of electronic monitoring devices which generally are not attached to the club, transport and set up can be difficult. Furthermore, in most cases, the prior art devices do not simulate the look and feel of actual putting.

One prior art device attempts to overcome these difficulties. U.S. Pat. No. 4,930,787 of Nobles discloses a self-contained, easily-portable, electronic putting sensor which purports to teach proper putting habits under realistic conditions. The sensor assembly of the Nobles device includes two mercury switches mounted in the club head which are connected to a signalling device and which measure (1) the angle of the club face throughout the swing and (2) the tempo of the swing. However, unlike the present invention, the Nobles device cannot detect a proper ball strike on the "sweet spot" of the club face. In addition, the design of Nobles device requires the user to hold the club face level relative to the horizon; this creates difficulty for golfers of varying heights and putting styles. Finally, the sensitivity of the sensor in the Nobles device varies with the force of the putt. Thus, a training club utilizing the Nobles device will be either insensitive to short putts or too sensitive to long putts.

It is desirable to provide a putting trainer which accurately measures the attitude, tempo, and position of the club independently of various swing speeds, as well as the accuracy of the ball strike, without materially affecting the putting club's balance, feel, or appearance. It is further desirable that any such device be rugged, simple to use, and low in cost. The present invention provides for an improved golf putting training device which is totally self-contained and which is configured to fit inside a conventional putting club. The sensor of the present invention provides for immediate and accurate feedback through all portions of the putting stroke, including ball strike accuracy. These and other advantages of the present invention will be readily apparent from the drawings, discussion and description which follow.

BRIEF DESCRIPTION OF THE INVENTION

There is disclosed herein a self-contained putting stroke training device which comprises an inertial sensor for detecting axial rotation of the putter. The sensor generates an alarm control signal and thereby activates an alarm when a predetermined angle of axial club head rotation is exceeded or when the ball strike position on the putter face is inaccurate. The inertial sensor may be mounted in either the head or the grip area of a standard putting club. The alarm may be audible, tactile or visual; for example, it may be either a sound generator, a vibrator, or a light indicator.

BRIEF DESCRIPTION OF THE DRAWINGS

FIG. 1 is a perspective cut-away view of one embodiment of the putting trainer disposed within the head of a standard putting club;

FIG. 2 is a top plan partially cut-away view of a putting trainer disposed in the head of a standard putting club;

FIG. 3 is a perspective view of an inertial sensor having an electrical detector structured in accord with the principles of the present invention;

FIG. 4 is a top plan view of an inertial sensor having an electrical detector;

FIG. 5 is a perspective view of an inertial sensor having an optical detector;

FIG. 6 is a perspective view of an inertial sensor having an electromagnetic detector;

FIG. 7 is a perspective and partially cut-away view of a putting trainer structured in accord with the principles of the present invention disposed within the grip area of the club; and FIG. 8 is a schematic diagram of one particular embodiment of electronic circuitry which may be used in connection with the sensor of the present invention.

DETAILED DESCRIPTION OF THE DRAWINGS

Referring now to the drawings and, in particular to FIGS. 1 and 2, there is depicted a putting stroke trainer 10 for use with a golf putter, said trainer 10 comprising an inertial sensor 12 and an alarm 42 (not shown). The inertial sensor 12 is operative to provide an alarm control signal if axial rotation of the putter occurs. As used herein, the term "axial rotation" shall refer to any rotation of the golf club about an axis parallel to the shaft of the club. The net effect of axial rotation is that different portions of the face of the club will be accelerated at different rates causing a turning of the club face. In the event of axial rotation, an alarm 42 is activated which provides a detectable output whereby the golfer is notified of the improper axial rotation of the putter during the stroke. Likewise, the alarm 42 is activated if the ball strike position is inaccurate. The alarm 42 may be either audio, visual, or tactile in nature.

The inertial sensor 12 comprises an elongated arm 14 and a counterweight 16 supported on a pivot 20 attached to a pivot support 21 which, in this embodiment, is within the putter head 5. Pivot support frame 21 is rigidly attached to the putter head 5 such that the pivot 20 is essentially parallel to the putter shaft 7. The elongated arm 14 is disposed in a plane parallel to the face of the putter head 5.

A counterweight 16 is positioned on or near a first end 14a of the elongated arm 14 and balances the arm 14 about the pivot 20. An adjustable spring element 18 is provided between the elongated arm 14 and the pivot support frame 21. Spring 18 provides a small centering force such that the elongated arm 14 returns to a given position when undisturbed. A second free end 14b of the elongated arm 14 is disposed proximal to a detector 22. As best shown in FIG. 2, the elongated arm 14 and counterweight 16 are capable of rotation about the pivot 20 in the plane of the page which corresponds to the axial rotation of the putter shaft 7. Thus, an improper putting stroke producing axial rotation of the putter will cause the relative rotation of the elongated arm 14 about the pivot 20, causing it to contact the detector 22 which, in turn, activates the alarm 42.

In some embodiments as shown in FIG. 2, an additional damping weight 70 is added perpendicular to the elongated arm 14/counterweight 16 assembly in the direction of the club face. The primary purpose of the damping weight 70 is to provide a centering force at ball impact, damping out shock forces. This allows the elongated arm 14 to be sensitive to the small rotational forces due to head rotation, while not upset at ball impact. The damping weight 70 is small so it does not cause significant deflection due to lateral forces.

FIG. 3 depicts a particular embodiment of the present invention which includes an inertial sensor 12 which has an electrical detector 36. A wire 37a establishes electrical communication with the arm 14 through the spring 18. A second wire 37b establishes electrical communication with the detector 36, which comprises a pair of electrical contacts mounted in proximity to the free end 14b of the elongated arm 14. The wires 37a and 37b are electrically in series with an alarm 42 and a battery 62. When the elongated arm 14, which is made of electrically conductive material, deflects and touches the detector 36, a circuit is completed and current can flow from the battery 62 to activate an alarm 42. In this manner, an indication is given when axial rotation of the putter head 5 occurs.

The rotational inertia of the elongated arm 14/counterweight 16 assembly is such that any rotation of the club head 5 causes the elongated arm 14 to touch the detector 36. The centering force generated by spring 18 is small compared to the inertial force. The deflection of the elongated arm 14 is fairly independent of the speed or force of the stroke, since it does not depend on lateral forces. Sensitivity of the electrical detector 36/elongated arm 14 to club head rotation can be changed by adjusting the distance between the free end 14b of the elongated arm 14 and the inner surface of the detector 36 when the inertial sensor 12 is at rest or undisturbed. For example, as the distance between the free end 14b of the elongated arm 14 and the detector 36 increases, the sensitivity of the inertial sensor 12 decreases.

The present invention 10 is also capable of detecting an off-center ball strike. A ball which is not struck by the "sweet spot" of the club head 5 will cause a slight rotation of the club face at impact. It is this rotation that causes the ball to go off of the desired track. The elongated arm 14 is very sensitive to this type of pure rotation, deflecting and activating the alarm 42. However, a ball strike on the "sweet spot" does not cause any rotation of the club head 5, and the elongated arm 14 remains undisturbed. For example, referring now to FIG. 2, even a forceful stroke on center will not deflect the elongated arm 14 onto the detector 22 due to the inherent balance of the inertial sensor 12.

Since the trainer 10 does not depend on lateral forces, the putter can be held in any position relative to the horizon before the stroke without tripping the alarm 42. The only requirement imposed on the golfer is that the club head 5 remain in the desired path which is perpendicular to the line of travel.

The inertial sensor 12, previously described with reference to FIG. 3, uses a detector 36 having electrical contacts to activate the alarm 42. It is desirable, although not mandatory, to eliminate the contacts of detector 36 because of their sensitivity to dirt and corrosion over time. Accordingly, FIG. 5 shows an alternate embodiment of an inertial sensor 12 which employs an optical detector 24 instead.

As in the electrical detector 36, an elongated arm 14 with a counterweight 16 attached thereto is suspended from a pivot 20. However, instead of the elongated arm 14 having a free end 14b, in the optical detector 24 a diffuse reflector 30 such as a matte surface or a specular reflector such as a mirror is attached thereto. Counterweight 16 is sized to balance the entire assembly about pivot 20 and the assembly comprising the elongated arm 14, the counterweight 16, and the mirror 30 is free to rotate about the pivot 20. As in the electrical detector 36, a small centering spring 18 is provided to position the elongated arm 14 when the optical detector 24 is undisturbed. An opticoupler unit 24 is shown in FIG. 5 which is fixed in position within the club head 5. The opticoupler 24, a commercially available item, consists of a light source 26 and a photodetector 28. Terminal 32 provides power to the light source 26 while terminal 34 carries a voltage signal from photodetector 28. The voltage signal at terminal 34 varies with the amount of light reflected into the photodetector 28. Mirror 30 is oriented to give maximum light to the photodetector 28 while the assembly is at rest. Accordingly, any movement of the mirror 30 due to a rotation of the club head 5 will vary the light going into the photodetector 28 and change the voltage level at terminal 34. The fluctuation in voltage at terminal 34 can be used to activate the alarm 42.

An alternate embodiment of the inertial sensor 12 is shown in FIG. 6. In FIG. 6, the detector 22 is electromagnetic. The entire inertial sensor 12 consists of a commercially available meter movement 72. Like the inertial sensor 12 in FIG. 1, the sensor 12 comprises an elongated arm 14 and a counterweight 16. The elongated arm 14 is affixed to a coil 48 which consists of conductive wire and which is pivotally mounted to the pivot support frame 21. Thus, the assembly comprising the elongated arm 14, the counterweight 16, and the coil 48 is free to rotate relative to the pivot support frame 21. A permanent magnet 46 is suspended inside the coil 48 by a magnet support member 47 which is attached to the pivot support frame 21.

Any movement of the elongated arm 14 will induce a slight voltage in the coil 48 due to the electromagnetic effect. Wires 49a and 49b are connected to the coil 48 and carry the voltage signal. Thus, a movement of the elongated arm 14 due to rotation of the club head 5 will create a voltage between wires 49a and 49b, which can be used to activate the alarm 42. This is directly opposite to the normal use of such a meter movement 72: normally an external voltage would be applied between wires 49a and 49b to cause a movement of the elongated arm 14.

This application of a meter movement 72 has distinct advantages in that a commercially available product can be used for the inertial sensor 12 with minimum modifications. In addition, no set rest position of elongated arm 14 is required, such as between electrical contacts or a mirror 30 positioned relative to the opticoupler 24. The voltage is created by movement from an arbitrary rest position so there are no problems with adjustment over time.

It is also desirable in some instances to mount the entire putting trainer 10 in the grip 9 of the putter shaft 7 for durability and ease of assembly. This is possible because the inertial sensor 12 does not depend on lateral forces which are minimal near the grip end 9 of the club. In pure rotation, the grip 9 rotates as much as the putter head 5 so it is possible to accurately measure rotation at the grip 9.

FIG. 7 shows an embodiment of an inertial sensor 12 mounted in a putter grip 9. A rotatable weight 56 is attached to an elongated arm 14. The elongated arm 14 is secured at one end to a first portion of the grip 50; the other end of the elongated arm 14 is attached to one end of spring 54, the other end of spring 54 being attached to a second portion of the grip 52. The length of the elongated arm 14 is parallel to the axis of the club shaft 7, and the rotatable weight 56 is free to rotate about this axis.

The combination of the arm 14 and spring 54 provides a calibrated torsional restoring force for the rotatable weight 56 such that the rotatable weight 56 returns to a given position when undisturbed. A conductive arm 58 is attached to the rotatable weight 56 and rests between contacts 38 and 40. The conductive arm 58 is oriented in a direction perpendicular to the club face of the putter head 5 when the weight 56 is in its resting position.

The elongated arm 14 is preferably of conductive material such that electric current can be fed from the fixed end of the elongated arm 14 to the conductive arm 58. Thus, if the conductive arm 58 comes in contact with either contact 38 or 40, a circuit can be made which will activate the alarm 42.

Since this embodiment of the inertial sensor 12 is not located near the club head 5, it offers the additional advantage of not affecting club swing weight.

Like the previous embodiment, this inertial sensor 12 will not detect lateral "push-pull" motions of the club head 5 during the swing. Any lateral motion of the club will cause the ball to be off-center on the club face, however, which will be immediately detected.

The spacing of contacts 38 and 40 determine the sensitivity of the mechanism to rotation of the club head 5. This inertial sensor 12 will also respond to small club head 5 rotations generated by striking the ball off of the "sweet spot."

FIG. 8 shows a schematic diagram of a typical alarm signalling circuit that may be employed in conjunction with the rotational inertial sensor 12 of the putting training device 10 to alert the golfer when an improper stroke has been executed. The circuit is designed to provide a sustained electrical signal of predetermined duration upon momentary completion of the circuit for actuation of the alarm 42. Referring specifically to FIG. 8, the figure consists of a type 555 integrated timer IC 60 powered by a battery 62. A master power switch 64 is used to activate the signalling circuit for use. Terminals 66 and 67, when connected, activate the signal for a predetermined duration. Thus, terminal 66 could be connected to wire 37a of FIG. 3 and terminal 67 connected to wire 37b of FIG. 3. A momentary contact by the sensing assembly would thus activate the signal. An audible signal device 68 is shown in FIG. 8. This could also be a visible light or vibrating device consisting of a motor with eccentric weight mounted in the grip weight of the club. The intent is to provide some means of alerting the golfer when the inertial sensor 12 detects a putting error.

The master power switch 64 is preferably mounted in the area of the grip 9, for easy reach during normal use of the club. It can be a momentary contact switch or a toggle type switch that stays on the "on" or "off" position.

The entire signalling circuit and battery 62 are very compact and can easily be packaged inside the club grip. This feature, along with the compact sensing device, makes for a training club that is almost indistinguishable from a standard club.

When positioned inside the head 5 or grip 9 of a standard golf putter, the training device 10 is triggered at various phases of the putting stroke if the stroke is improper. For example, during the back swing phase, the club is moved along the line of intended travel of the ball. In a proper back swing, the striking face of the putter must remain perpendicular to that line of travel at all times. The rotational inertial sensor 12 detects a predetermined deviation of club face angle from that line, immediately alerting the golfer of a fault in club face angle.

Likewise during the forward portion of the stroke, the club face must remain perpendicular to the line of travel. The putting trainer 10 immediately alerts the golfer of deviation from the proper line. At the impact point of a proper stroke, the ball should strike the club face at its mass center, or "sweet spot." If the ball is not struck on center, the inertial sensor 12 will immediately detect a slight resultant club head rotation and alert the golfer of the error.

Sensitivity of the trainer may be adjusted by varying the spacing of the contacts in the electrically activated detector or by changing the geometry of the optical detector, or by varying the parameters of the electromagnetic detector. Sensitivity may also be varied by varying the length of the arm, or the strength of the centering spring on the mass of the inertial sensor. The balance nature of the inertial sensor 12 is such that it requires no adjustment for long or short putts.

It should also be kept in mind that other sensor/detector geometries may be employed to detect axial rotation of the club. For example, the arm may be shortened or lengthened. The detector may comprise a capacitive detector or a magnetic proximity detector.

Having thus described my invention, it can be seen that numerous alternative configurations can be envisioned by one skilled in the art by utilizing the teachings of this invention. It is the claims and all equivalents thereof, not the embodiments and exemplifications described herein, which define the true scope of the invention.

I therefore claim:

1. A putting swing trainer comprising a golf putter including an elongated shaft and a head having a ball striking face, an inertial sensor, means for attaching said sensor to said putter so that said inertial sensor is operative to provide an alarm control signal if axial rotation of said putter occurs around the longitudinal axis of the shaft of said putter; and
  an alarm operative to receive the alarm control signal from the inertial sensor and to provide a detectable output in response so that,
  the user is provided with an indication if axial rotation of the putter around said axis occurs during the swing thereof.

2. A swing trainer as in claim 1, wherein the inertial sensor includes a generally elongated arm having the length thereof disposed in a plane parallel to the bore striking face of the putter, said arm being suspended on a pivot attached to a pivot support so that axial rotation of the putter while it is being swung will cause relative rotation of the arm about the pivot.

3. A swing trainer as in claim 2, wherein the inertial sensor further includes a detector for determining if rotation of the arm relative to the pivot has occurred.

4. A swing trainer as in claim 3, wherein said detector is an optical detector and said arm includes a reflective body disposed thereupon.

5. A swing trainer as in claim 4, wherein said optical detector includes a light source disposed to project a beam of light onto said reflective body during at least a portion of the time the arm rotates relative to the pivot and a photodetector disposed to receive the beam of light reflected form the reflective body.

6. A swing trainer as in claim 2, wherein the inertial sensor further includes a spring associated with the arm.

7. A swing trainer as in claim 2, wherein said arm is pivotally supported at a point between the two ends thereof and wherein one of the ends has a counterweight associated therewith.

8. A swing trainer as in claim 3, wherein said detector is an electrical detector and the arm includes a first electrical contact associated therewith and the detector includes a second electrical contact associated therewith, said contacts disposed so that the relative rotation of the arm effects a change of state of the contacts.

9. A swing trainer as in claim 3, wherein said detector is an electromagnetic detector wherein said arm includes a coil associated therewith and said detector further includes a magnet suspended proximate said coil by a support member whereby rotation of the arm and associated coil relative to the magnet causes a current to flow in the coil.

10. A swing trainer as in claim 1, wherein the inertial sensor is disposed in the head of the putter.

11. A swing trainer as in claim 1 wherein the inertial sensor is disposed in the grip of the putter.

12. A swing trainer as in claim 11 wherein the inertial sensor includes a generally elongated arm having the length thereof disposed in a plane parallel to the grip of the putter, said arm having one end attached to a first portion of the grip and the other end of said arm attached to a spring, said spring being attached to a second portion of the grip, said sensor further including a rotatable weight supported at a point between the two ends of the arm, said weight having a conductive arm protruding therefrom in a cantilever fashion, the free end of said conductive arm being disposed between a pair of contacts each in electrical communication with said alarm, whereby axial rotation of the putter during the stroke causes the conductive arm to touch one of said contacts, thus activating the alarm and providing the user with an indication of an improper putting stroke.

13. A swing trainer as in claim 1, wherein the detectable output provided by the alarm is an audible output.

14. A putting swing trainer comprising a golf putter including an elongated shaft, a head having a ball striking face, and an inertial sensor,
  said sensor including a generally elongated arm having length thereof disposed in a plane parallel to the ball striking face of the putter, said arm supported on a pivot so that axial rotation of said putter around the longitudinal axis of said shaft while it is being swung will cause the relative rotation of the arm about said pivot;
  a detector associated with the sensor for indicating if said relative rotation of said arm about said pivot has occurred and for providing an alarm control signal in response thereto; and
  an alarm operative to receive the alarm control signal and to provide a detectable output in response so that,
  the user is provided with an indication if axial rotation of the putter occurs around the longitudinal axis of the shaft during the swing thereof.

* * * * *